US012039014B2

(12) United States Patent
Alcock et al.

(10) Patent No.: US 12,039,014 B2
(45) Date of Patent: Jul. 16, 2024

(54) OBTAINING POTENTIAL MATCH RESULTS FOR A REFERENCE IMAGE ACROSS A PLURALITY OF SYSTEM SITES

(71) Applicant: MOTOROLA SOLUTIONS, INC., Chicago, IL (US)

(72) Inventors: Nicholas Alcock, Vancouver (CA); Eric Peterson, Worchester, MA (US); Shaun Marlatt, North Vancouver (CA); Liia Fadeeva, New Westminster (CA); Kevin Piette, Carlisle, MA (US); Brenna Randlett, Vancouver (CA); Quan Pan, Vancouver (CA); Hugo Fitzpatrick, Vacouver (CA); Jehan Wickramasuriya, St. Charles, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 324 days.

(21) Appl. No.: 17/107,980

(22) Filed: Dec. 1, 2020

(65) Prior Publication Data

US 2022/0171986 A1 Jun. 2, 2022

(51) Int. Cl.
*H04N 7/18* (2006.01)
*G06F 18/22* (2023.01)
*G06V 10/24* (2022.01)
*G06V 20/52* (2022.01)

(52) U.S. Cl.
CPC .............. *G06F 18/22* (2023.01); *G06V 10/24* (2022.01); *G06V 20/52* (2022.01); *H04N 7/183* (2013.01)

(58) Field of Classification Search
None
See application file for complete search history.

(56) References Cited

U.S. PATENT DOCUMENTS

| 9,877,086 | B2 | 1/2018 | Richardson et al. |
| 10,121,515 | B2 | 11/2018 | Doumbouya et al. |
| 2013/0097139 | A1 | 4/2013 | Thoresen et al. |
| 2017/0180780 | A1 | 6/2017 | Jeffries |
| 2018/0157939 | A1* | 6/2018 | Butt ..................... H04N 21/466 |
| 2019/0102397 | A1 | 4/2019 | Hornkvist et al. |
| 2021/0027431 | A1* | 1/2021 | Ma ....................... G06K 9/4671 |

* cited by examiner

*Primary Examiner* — Samuel D Fereja

(57) ABSTRACT

Obtaining potential match results for a reference image across a plurality of system sites is disclosed. A computing device of one of the system sites includes a signature generator identifiable as a first version amongst a plurality of versions of a respective plurality of possible signature generators. The computing device is configured to generate, within the first signature generator, a first signature corresponding to a cropped object portion of a larger image. The first signature is distinctive to the first version. The computing device is further configured to determine that the cropped object portion being processed within the computing device is a match result for a similar images search. A server is configured to receive the cropped object portion and the first signature from the computing device.

20 Claims, 3 Drawing Sheets

OBTAINING POTENTIAL MATCH RESULTS FOR A REFERENCE IMAGE ACROSS A PLURALITY OF SYSTEM SITES

BACKGROUND

Appearance searching is a video-specific example of analytics-powered, similar images searching. Typically, appearance searching involves the deployment and operation of neural networks and other artificial intelligence technology to sort through lengthy amounts of video to quickly locate a specific object of interest. Appearance searching can improve incident response time and enhance forensic investigations by helping users compile robust video evidence, create a powerful narrative of events, and reveal an object's route or last-known location.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
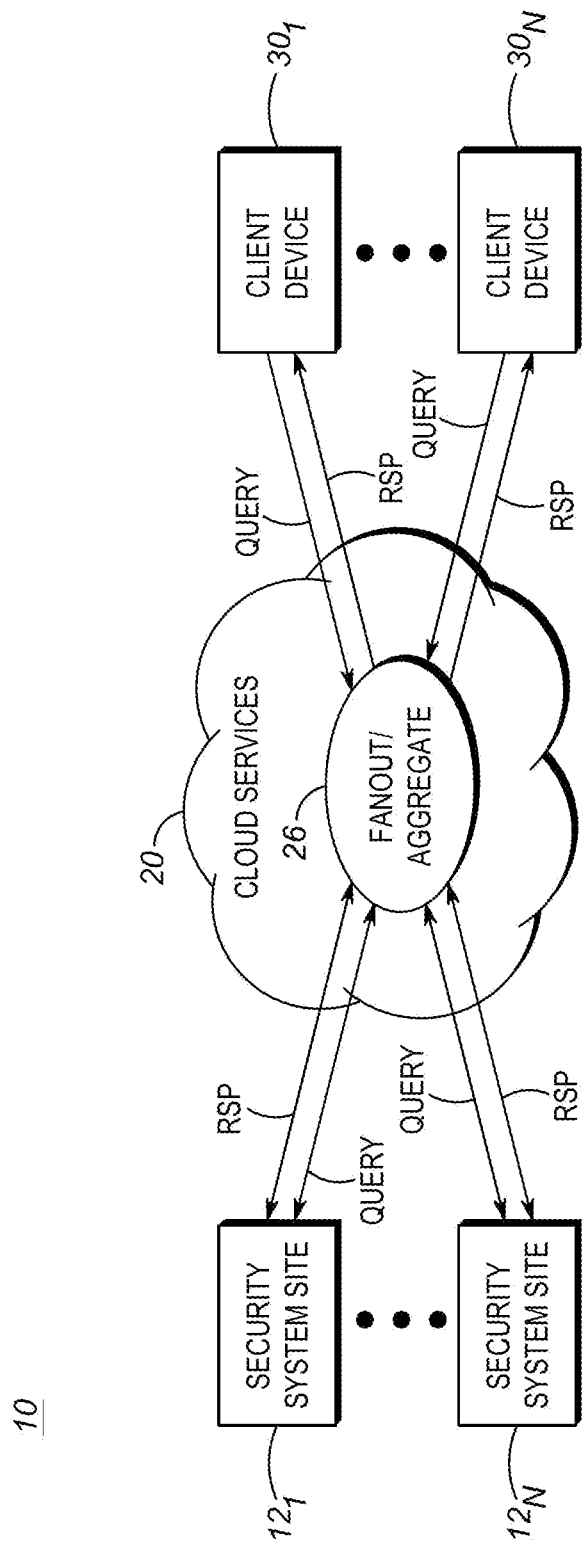
FIG. 1 is a block diagram of a network of security system sites in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiments, there is provided an apparatus that includes a first computing device. The first computing device includes a first signature generator identifiable as a first version amongst a plurality of versions of a respective plurality of possible signature generators. The first computing device is configured to generate, within the first signature generator, a first signature corresponding to a cropped object portion of a larger image. The first signature is distinctive to the first version. The first computing device is further configured to determine that the cropped object portion being processed within the first computing device is a match result for a similar images search. A second computing device includes a second signature generator identifiable as the first version or another different version amongst the versions. A server is communicatively in-between the first and second computing devices. The server is configured to receive the cropped object portion and the first signature from the first computing device. The server is further configured to make a determination that the first signature was generated by a first version-type generator. When the second signature generator is identified as the first version, the determination is used to confirm a version match and the first signature is sent to the second computing device. When the second signature generator is identified as the different version, then the first signature is determined to be unusable within the second computing device.

In accordance with another example embodiment, there is provided a method that includes generating, within a first computing device, a first signature corresponding to a cropped object portion of a larger image, and the first signature being distinctive to a first version-type generator. The method also includes determining that the cropped object portion being processed within the first computing device is a match result for a similar images search. The method also includes transmitting the cropped object portion and the first signature from the first computing device to a server. The method also includes making a determination, at the server, that the first signature was generated by a generator that is the first version-type generator. When a second signature generator within a second computing device is identified as being the first version-type generator, the determination is used to confirm a version match before sending the first signature from the server to the second computing device. When the second signature generator is identified as being a different version-type generator, the first signature is then determined to be unusable within the second computing device.

Each of the above-mentioned embodiments will be discussed in more detail below, starting with example system and device architectures of the system in which the embodiments may be practiced, followed by an illustration of processing blocks for achieving an improved technical method, device, and apparatus for obtaining potential match results for a reference image across a plurality of system sites.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of a network 10 that includes a plurality of security system sites $12_1$ to $12_N$ within which methods in accordance with example embodiments can be carried out. In addition to the security system sites $12_1$ to $12_N$, the network 10 also includes a cloud services entity 20 located at a central point within the network 10. Each of the security system sites $12_1$ to $12_N$ is communicatively coupled to the cloud services entity 20 by way of, for example, the Internet and a cloud-interfacing Application Programming Interface (API) 26.

In addition to the security system sites $12_1$ to $12_N$, a plurality of client devices $30_1$ to $30_N$ may also be communicatively coupled to the cloud services entity 20 by way of, for example, the Internet and the cloud-interfacing API 26. Each of the client devices $30_1$ to $30_N$ is a selected one or more of the following: a handheld device such as, for example, a tablet, a phablet, a smart phone or a personal digital assistant (PDA); a personal computer; a laptop computer; a smart television; and other suitable devices. In the illustrated example embodiment, the client devices $30_1$ to $30_N$ may possess certain functionalities and capabilities found within the sites (for example, each may be configured to initiate an appearance or other type of search); however the client devices $30_1$ to $30_N$ are reliant on server(s) within the site(s) and/or the cloud services entity 20. Also, in some examples each of the client devices $30_1$ to $30_N$ may be similar to one of the computer terminals found in one of the system sites $12_1$ to $12_N$, (such computer terminals are shown in FIG. 2, which is described in detail below).

Figure 2:
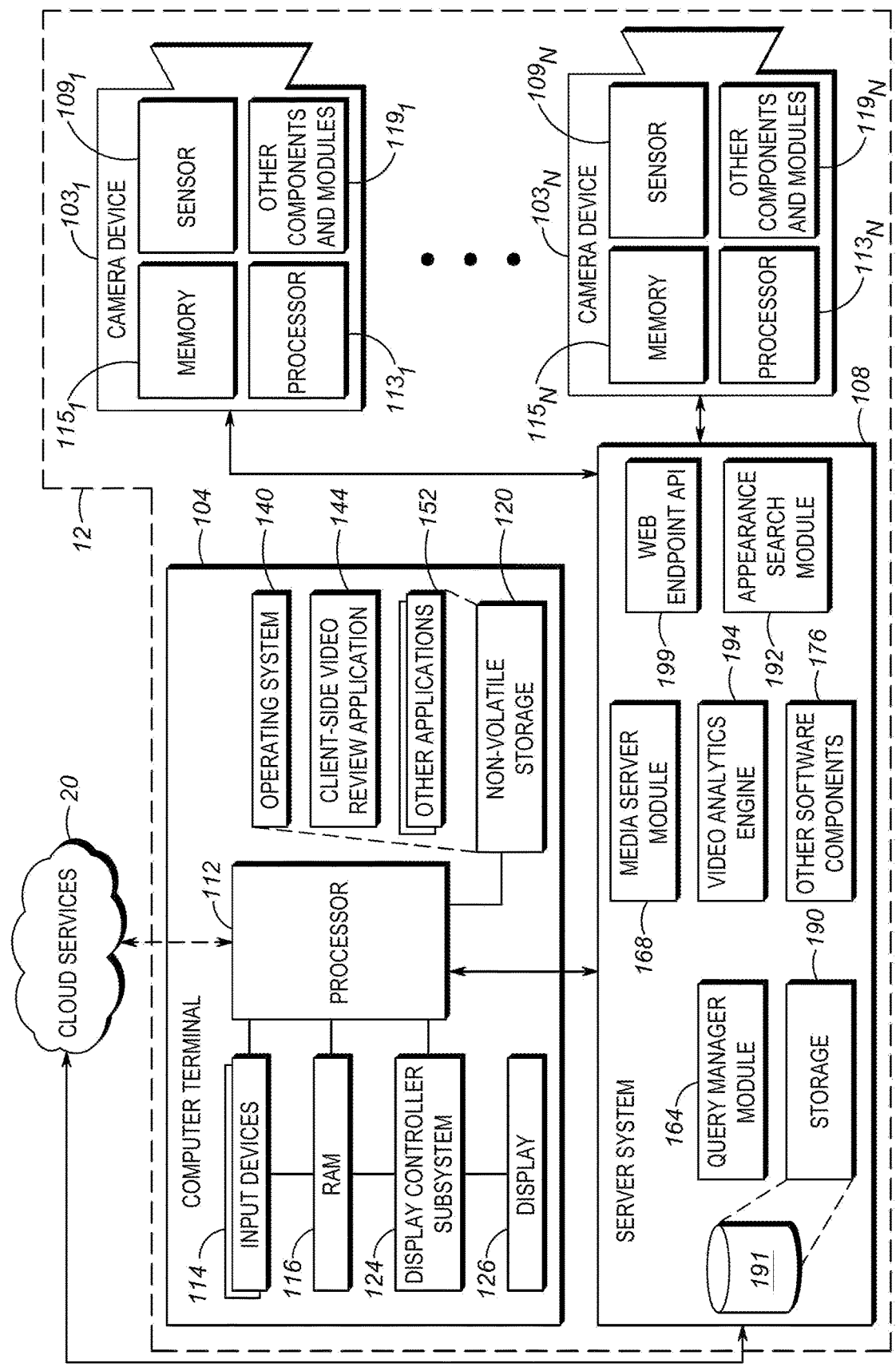
FIG. 2 is a block diagram illustrating more details of one of the security system sites shown in FIG. 1.

Continuing on, FIG. 2 is a block diagram of an example one of the security system sites 12 within which methods in accordance with example embodiments can be carried out. Included within the illustrated security system site 12 are a computer terminal 104 and a server system 108. (It will be understood that even though just one computer terminal 104 and just one server system 108 are shown for ease and simplicity of illustration, any suitable number of computer terminals and server systems within one of the security system sites $12_1$ to $12_N$ is contemplated, and that the actual number may vary based on, for example, the particular needs of the individual system site.)

In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could he of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126. In some examples, the computer terminal 104 may include more than one display screen 126 (it is contemplated that the computer terminal 104 may include any suitable number of display screens).

Still with reference to the computer terminal 104 of the security system site 12, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Regarding the client-side video review application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate carrying out one or more appearance searches). In at least one example embodiment, the search UI module may provide a user interface similar to what is described in U.S. Pat. No. 10,121,515 issued to Avigilon Corporation (hereinafter "US '515"). For example, a user may operate one or more of the input, devices 114 to confirm a match by "starring" an image thumbnail as described and illustrated in FIG. 17 and col. 21, lines 24-56 of US '515.

Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of specifically defined video data (and respective metadata) in support of, for example, client-side video review, video export, managing event detection, etc. In this regard, the query manager module 164 is communicatively coupled to one or more data stores 190 (described later herein in more detail) and an appearance search module 192 that supports appearance searches.

Still with reference to FIG. 2, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $103_1$-$103_N$ in the security system site 12. The server system 108 also includes a video analytics engine 194. The video analytics engine 194 can, in some examples, be any suitable one of known commercially available software that carry out computer vision related functions (complementary to any video analytics performed in the security cameras) as understood by a person of skill in the art. Also, those skilled in the art will appreciate that, in some instances, the video analytics engine may be programmed with a detection classifier that evaluates a received video stream (for example, an image or part of an image of the video stream captured by one of camera devices $103_1$-$103_N$ which are described in more detail later herein) to determine if an instance of an object of interest that is defined in the detection classifier is detected or not from the evaluated video stream.

The server system 108 also includes a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded security video, non-video sensor data, still images, etc. in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc.

The illustrated security system site 12 is connected to the cloud services entity 20. For example, the computer terminal 104 may be connected to the cloud services entity 20 by the Internet and/or one or more wireless and/or wired wide area networks (examples of which were previously herein detailed). Similarly, the server system 108 may be connected to the cloud services entity 20 by the Internet and/or one or more wireless and/or wired wide area networks (examples of which were previously herein detailed). Communicative connection of the server system 108 to the cloud services entity 20 is also facilitated in part web endpoint API 199 (explained in more detail subsequently).

As will be appreciated by those skilled in the art, part of the functionalities herein described as being provided by the server system 108 may optionally be instead fully or partly provided by the cloud services entity 20. In some examples, one or more storages are provided at the cloud service location to store video and/or still images employed (or otherwise made available for use) within the security system site 12.

The illustrated security system site 12 includes the plurality of camera devices $103_1$-$103_N$ (hereinafter interchangeably referred to as "cameras $103_1$-$103_N$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the security system site 12 includes any suitable number of cameras (i.e. n is any suitable integer greater than one).

The camera 103 includes an image sensor 109 (corresponding to one of the sensors $109_1$-$109_N$ shown in FIG. 2) for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system site 12 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, corner camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The camera 103 includes one or more processors 113 (corresponding to one of the processors $113_1$-$113_N$ shown in FIG. 2), other components and modules 119 (corresponding to one of drawing elements $119_1$-$119_N$ shown in FIG. 2), and one or more memory devices 115 (corresponding to one of the memories $115_1$-$115_N$ shown in FIG. 2) coupled to the processors and one or more network interfaces. Regarding the other components and modules 119, just one example amongst various others would be a video analytics module. A video analytics module within the camera 103 may generate metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a random access memory and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 2, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Although the security system site 12 illustrated in FIG. 2 only explicitly shows camera devices coupled to the server system 108, it will be understood that the security system site 12 is not limited in contemplated compositions to just camera devices. Some examples of the security system site 12 include a heterogeneous mixture of both camera devices and other sensor devices coupled to the server system 108. One type of alternative sensor device is a radar-based sensor device such as, for example, the Avigilon Presence Detector (APD)™ sold by Avigilon Corporation.

Figure 3:
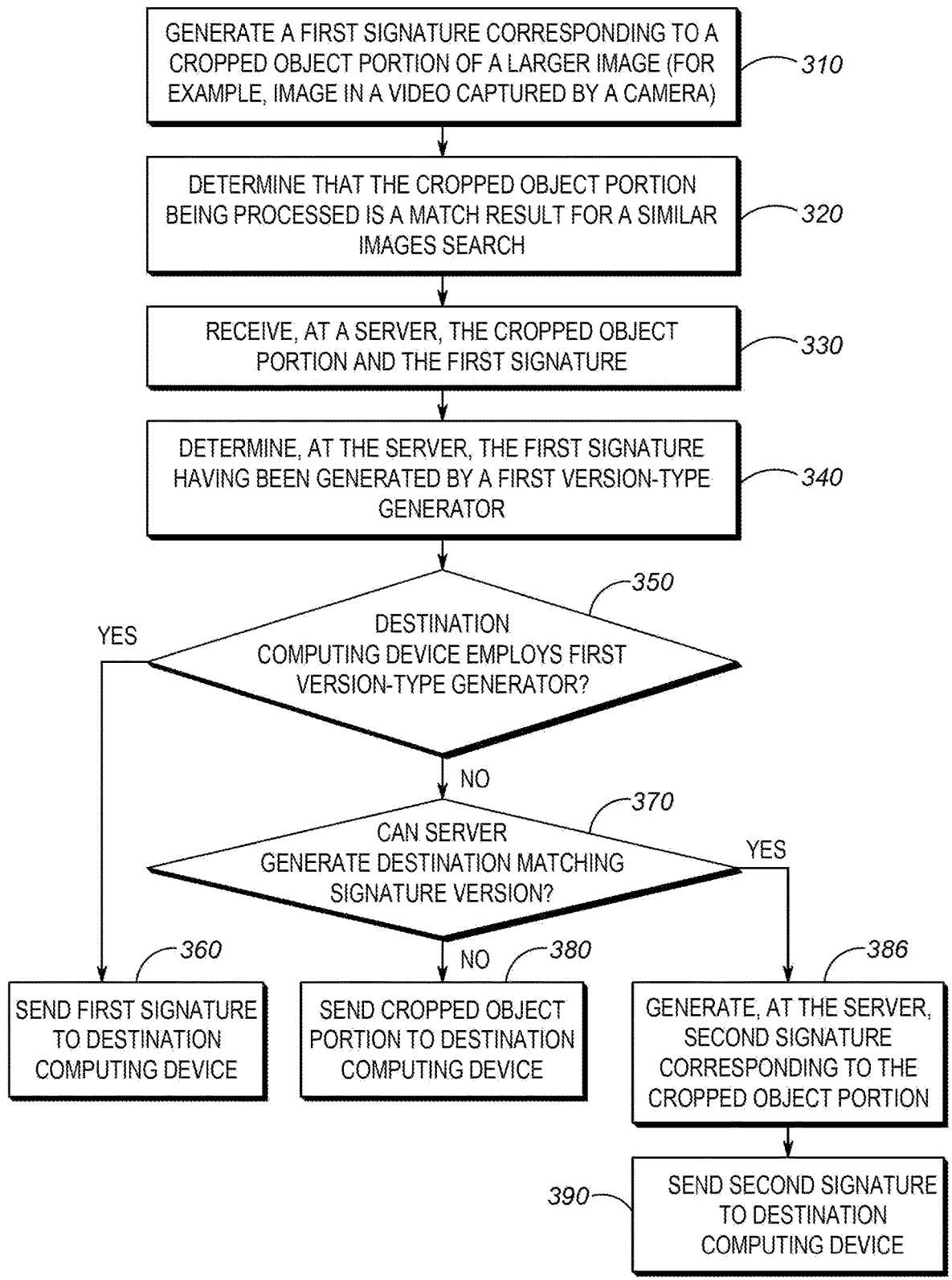
FIG. 3 is a flow chart illustrating a method of generating signatures in support of similar images searching in accordance with an example embodiment.

Reference is now made to FIG. 3. FIG. 3 is a flow chart illustrating a method 300 of generating signatures in support of similar images searching in accordance with an example embodiment.

First in the method 300, a first signature is generated (310) corresponding to a cropped object portion of a larger image (this larger image may be, for example, an image corresponding to a particular moment in time of a video captured by the camera 103).

Next, it is determined (320) that the cropped object portion being processed in connection with a similar images search (such as, for example, an appearance search) is a match result. This determination may be made by operation of one or more of the appearance search module 192 and the video analytics engine 194 carrying out one or more comparison operations employing the first signature. Alternatively or in combination with comparison operations carried out within the server system 108, the action 320 may include receiving user input confirming a match. Such user input may take the form of, for example, starring an image thumbnail as disclosed in US'515. Furthermore, those skilled in the art will appreciate that if the image (include its cropped object portion) is confirmed by a human user as a match, then such an image may be considered to be a so-called reference image. In at least one alternative example, the reference image may be a stored photo. For instance, it is contemplated that a reference photo stored on one of the client devices $30_1$ to $30_N$ may be sent as part of a query to the cloud services entity 20 (and still in such case later actions of the illustrated method 300 can nonetheless be carried out substantially as shown and herein described).

Continuing on in respect of the illustrated method 300, the cropped object portion and the first signature are received (330) at a server (such as, for example, the cloud services entity 20). (For convenience and sake of clarity, any reference to "SERVER" within FIG. 3 is understood to include some suitable cloud services entity amongst other possible examples.)

Next, the cloud services entity determines (340) that the first signature was generated (i.e. within the originating computing device) by a first version-type generator.

Next in the illustrated method 300 is decision action 350, where it is determined whether or not the destination computing device employs a first version-type generator (i.e. same version-type as with respect to the originating computing device). If "YES", then the cloud services entity sends (360) the first signature to the destination computing device. If "NO", then decision action 370 follows.

In respect of the decision action 370, a determination is made as to whether or not the cloud services entity can generate a destination matching signature version. If "NO", then the cropped object portion is sent (380) to the destination computing device by itself (i.e. no signature is sent to the destination computing device such that generation of a second different signature will be tasked to the destination computing device as the first signature is unusable within the destination computing device). By contrast if the determination is "YES", then the cloud services entity generates (386) the second different signature corresponding to the cropped object portion. It will be noted that the "YES" branch of the decision action 370 corresponds to an implementation where the cloud services entity includes a plurality of signature generators where each is a different version of at least some of the plurality of all possible versions of the signature generators that may be in existence (for example, in existence amongst the security system sites $12_1$ to $12_N$ within the network 10 of FIG. 1).

Next following the action 386, the cloud services entity sends (390) the generated second signature to the destination computing device.

In accordance with at least some examples, any of the actions 360, 380 and 390 may include the cloud-interfacing API 26 (FIG. 1) dispatching a query by way of, for instance, a direct invoke method provided by the cloud services entity 20. In terms of results being returned back from the queried computing device, the web endpoint API 199 (FIG. 2) may provide the results to the cloud-interfacing API 26 by way of, for instance, a direct invoke response.

As should be apparent from this detailed description above, the operations and functions of the electronic computing device are sufficiently complex as to require their implementation on a computer system, and cannot be performed, as a practical matter, in the human mind. Electronic computing devices such as set forth here are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot carry out real-time or near real-time cross-site appearance searching [or other types of similar images searching], among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. Apparatus comprising:
    a first computing device that includes a first signature generator identifiable as a first version amongst a plurality of versions of a respective plurality of possible signature generators, the first computing device configured to:
        generate, within the first signature generator, a first signature corresponding to a cropped object portion of a larger image, and the first signature being distinctive to the first version;
        determine that the cropped object portion being processed within the first computing device is a match result for a similar images search; and
    a second computing device that includes a second signature generator identifiable as the first version or another different version amongst the versions; and
    a server communicatively in-between the first and second computing devices, the server configured to:
        receive the cropped object portion and the first signature from the first computing device;
        make a determination that the first signature was generated by a first version-type generator; and
        when the second signature generator is identified as the first version, use the determination to confirm a version match and then send the first signature to the second computing device, or when the second signature generator is identified as the different version, then determine that the first signature is unusable within the second computing device,
    wherein the first computing device forms part of a first security system site, and the second computing device forms part of a second security system site different than the first security system site.

2. The apparatus as claimed in claim 1 wherein:
    the server is a cloud services entity;
    the first computing device is remote from the server; and
    the second computing device is remote from the server.

3. The apparatus as claimed in claim 2 wherein the first computing device is remote from the second computing device.

4. The apparatus as claimed in claim 1 wherein the first computing device is remote from the second computing device.

5. The apparatus as claimed in claim 1 wherein the match result for the similar images search is a match result for an appearance search.

6. The apparatus as claimed in claim 1 wherein the server includes at least two signature generators each being a different version of at least some of the plurality of versions.

7. The apparatus as claimed in claim 6 wherein one of the at least two signature generators is of a version that matches the different version, and the server is further configured to:
    generate, within the one of the at least two signature generators, a second signature corresponding to the cropped object portion, and the second signature being distinctive to the different version; and
    send the second signature to the second computing device.

8. The apparatus as claimed in claim 7 wherein the second computing device is configured to receive the second signature and employ the second signature therein to find potential match results for the similar images search.

9. The apparatus as claimed in claim 8 wherein the second computing device is further configured to send a plurality of cropped object portions of a respective plurality of larger image corresponding to the potential match results to the first computing device via the server.

10. The apparatus as claimed in claim 1 further comprising at least one video camera communicatively coupled to the first computing device, the video camera being configured to:
    capture video that includes the larger image; and
    send the captured video to the first computing device.

11. A method implemented within an at least one network, the method comprising:

generating, within a first computing device, a first signature corresponding to a cropped object portion of a larger image, and the first signature being distinctive to a first version-type generator;

determining that the cropped object portion being processed within the first computing device is a match result for a similar images search;

transmitting the cropped object portion and the first signature from the first computing device to a server;

making a determination, at the server, that the first signature was generated by a generator that is the first version-type generator; and when a second signature generator within a second computing device is identified as being the first version-type generator, using the determination to confirm a version match and then sending the first signature from the server to the second computing device, or when the second signature generator is identified as being a different version-type generator, then determining that the first signature is unusable within the second computing device, wherein the first computing device forms part of a first security system site, and the second computing device forms part of a second security system site different than the first security system site.

12. The method as claimed in claim 11 wherein:
the server is a cloud services entity;
the first computing device is remote from the server; and
the second computing device is remote from the server.

13. The method as claimed in claim 12 wherein the first computing device is remote from the second computing device.

14. The method as claimed in claim 11 wherein the first computing device is remote from the second computing device.

15. The method as claimed in claim 11 wherein the match result for the similar images search is a match result for an appearance search.

16. The method as claimed in claim 11 wherein the server includes at least two signature generators each being a different version of at least some of a plurality of versions in existence.

17. The method as claimed in claim 16 wherein one of the at least two signature generators is of a version that matches the different version-type generator, and the method further comprising:

generating, within the one of the at least two signature generators, a second signature corresponding to the cropped object portion; and sending the second signature to the second computing device.

18. The method as claimed in claim 17 wherein the second computing device receives the second signature and employ the second signature therein to find potential match results for the similar images search.

19. The method as claimed in claim 18 wherein the second computing device sends a plurality of cropped object portions of a respective plurality of larger image corresponding to the potential match results to the first computing device via the server.

20. The method as claimed in claim 11 further comprising:

capturing, using at least one video camera communicatively coupled to the first computing device, video that includes the larger image; and sending the captured video to the first computing device.

* * * * *